US009020674B2

(12) United States Patent
Gregg et al.

(10) Patent No.: US 9,020,674 B2
(45) Date of Patent: Apr. 28, 2015

(54) DIVERSION OF ENERGY FROM REGENERATIVE BRAKING

(71) Applicants: Christopher Gregg, Gardena, CA (US); Justin Ward, Gardena, CA (US); Hidetoshi Kusumi, Gardena, CA (US)

(72) Inventors: Christopher Gregg, Gardena, CA (US); Justin Ward, Gardena, CA (US); Hidetoshi Kusumi, Gardena, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 65 days.

(21) Appl. No.: 13/737,869

(22) Filed: Jan. 9, 2013

(65) Prior Publication Data
US 2013/0274975 A1    Oct. 17, 2013

Related U.S. Application Data

(60) Provisional application No. 61/624,024, filed on Apr. 13, 2012.

(51) Int. Cl.
*B60W 10/196* (2012.01)
*B60W 10/30* (2006.01)
(Continued)

(52) U.S. Cl.
CPC ............ *B60W 10/196* (2013.01); *B60W 10/30* (2013.01); *B60W 30/1886* (2013.01); *B60W 2600/00* (2013.01); *B60W 10/26* (2013.01);
(Continued)

(58) Field of Classification Search
CPC .......... B60W 10/196; B60W 30/1886; B60W 2600/00; B60W 10/26; B60W 20/1062; B60W 30/1827; B60W 10/30; B60Y 2300/92; B60L 2240/545; B60L 1/003; B60L 1/02; B60L 3/0046; B60L 3/0061; B60L 11/1861; B60L 2240/36
USPC ............ 701/22; 903/903, 941, 947; 180/65.1, 180/65.27, 65.275
See application file for complete search history.

(56) References Cited

U.S. PATENT DOCUMENTS 3,300,619 A    1/1967    Nilssen
5,291,960 A *  3/1994    Brandenburg et al. .... 180/65.27
(Continued)

FOREIGN PATENT DOCUMENTS

GB    2344087     5/2000
JP    61210215    6/1987
(Continued)

*Primary Examiner* — Mary Cheung
*Assistant Examiner* — Brian P Sweeney
(74) *Attorney, Agent, or Firm* — Snell & Wilmer LLP (57) ABSTRACT

A regenerative braking system for a vehicle utilizing diversion of energy for efficient use or maintaining consistent vehicle performance. The regenerative braking system includes a generator for producing regenerative energy during slowing and includes switches connected to a battery and a plurality of devices. A processor is connected with the battery and the switches for controlling the configuration of the switches based on a characteristic of the battery. If the battery has a state of charge exceeding a predetermined threshold, the processor controls the switches to route the regenerative energy to the other devices. The processor also controls the switches to provide regenerative energy to specific devices where it may most desirably be utilized. Heating and cooling units of the vehicle may be alternatively or simultaneously connected to receive the regenerative energy for providing consistent vehicle slowing performance when the battery state of charge exceeds the predetermined threshold.

17 Claims, 4 Drawing Sheets

(51) Int. Cl.
*B60W 30/188* (2012.01)
*B60W 10/26* (2006.01)
*B60W 30/18* (2012.01)
*B60L 1/00* (2006.01)
*B60L 1/02* (2006.01)
*B60L 3/00* (2006.01)
*B60L 11/18* (2006.01)
*B60W 20/00* (2006.01)

(52) U.S. Cl.
CPC ......... *B60W20/1062* (2013.01); *B60Y 2300/92* (2013.01); *B60W 30/18127* (2013.01); *B60L 1/003* (2013.01); *B60L 1/02* (2013.01); *B60L 3/0046* (2013.01); *B60L 3/0061* (2013.01); *B60L 11/1861* (2013.01); *B60L 2240/36* (2013.01); *B60L 2240/545* (2013.01); *Y02T 10/7044* (2013.01); *Y02T 10/7005* (2013.01); *Y02T 10/705* (2013.01); *Y10S 903/903* (2013.01); *Y10S 903/947* (2013.01)

(56) References Cited

U.S. PATENT DOCUMENTS

| | | | |
|---|---|---|---|
| 5,557,181 A * | 9/1996 | Naito et al. | 318/376 |
| 6,040,561 A | 3/2000 | Murty | |
| 7,171,819 B2 | 2/2007 | Lui et al. | |
| 7,621,262 B2 * | 11/2009 | Zubeck | 123/543 |
| 2006/0028167 A1 | 2/2006 | Czubay et al. | |
| 2010/0315780 A1 | 12/2010 | Murakami | |
| 2011/0125351 A1 * | 5/2011 | Bauerle | 701/22 |
| 2011/0223463 A1 | 9/2011 | Katono et al. | |
| 2013/0221741 A1 * | 8/2013 | Stanek et al. | 307/9.1 |

FOREIGN PATENT DOCUMENTS

| | | |
|---|---|---|
| JP | 1153321 | 6/1989 |
| JP | 2011102568 | 5/2011 |
| WO | WO 9401893 | 1/1994 |

\* cited by examiner

DIVERSION OF ENERGY FROM REGENERATIVE BRAKING

CROSS REFERENCE TO RELATED APPLICATIONS

This application claims the benefit and priority of U.S. Provisional Application No. 61/624,024, filed on Apr. 13, 2012, the entire contents of which are hereby incorporated by reference.

BACKGROUND

1. Field

The present invention relates generally to regenerative braking systems for electric vehicles and improvements thereof. More particularly, the present invention relates to a regenerative braking system utilizing diversion of energy for electric automobiles and improvements thereof.

2. Description of the Related Art

Electric vehicles are becoming increasingly popular among consumers concerned with saving costs or becoming more environmentally conscious. Electric vehicles help reduce the carbon footprint of an individual by lessening or eliminating the creation of toxic byproducts normally generated when operating a standard automobile that utilizes an internal combustion engine. By utilizing electrical power stored in batteries or otherwise generated by components of the electric vehicle in place of conventional fossil fuels, the drive wheels or other power-consuming devices of the electric vehicle can be operated with reduced harmful waste products than would otherwise be possible in conventional, internal combustion engine vehicles. Unfortunately, due to battery limitations, electric vehicles often have a significantly reduced driving range when operating on electrical energy. This results in vehicles that can only travel substantially lessened distances between recharges of the batteries. In addition, the electricity costs for owners of such vehicles increases due to the additional power consumption from charging the vehicle's batteries.

One method for combating the above problems associated with electric vehicles is through the incorporation of a regenerative braking system. In conventional automotive regenerative braking systems, as a user slows down the automobile by removing their foot from the accelerator pedal, regenerative electrical enemy from the braking system is provided to the batteries of the automobile for charging the batteries. In this manner, the electric vehicle may recharge a portion of the batteries charge while still in use by the driver. Such a system not only increases the total driving range of the automobile but also can result in less electrical outlet energy needed from the user upon recharging of the batteries.

Unfortunately, conventional regenerative braking systems have a number of disadvantages. Typical regenerative braking systems have efficiency losses due to their operation in charging the batteries and subsequently discharging the batteries to power the desired electrical components of the vehicle, such as cabin temperature control systems. Moreover, when a driver slows down the electric vehicle and causes regenerative energy to flow to the batteries, a particular deceleration rate for the vehicle is obtained. However, when the batteries reach a fill state of charge, they stop accepting regenerative energy from the regenerative braking system and the energy is instead dissipated, for example as heat, and goes unutilized by the electric vehicle systems. Since a lower ambient temperature reduces the maximum charge capability of the batteries, regenerative energy that might otherwise be utilized in warmer temperatures to charge the batteries to a full state of charge sees a decrease in efficiency when exposed to colder temperatures.

Not only is this non-utilization wasteful from an energy standpoint, but it also affects vehicle performance by altering the deceleration rate of the electric vehicle. Thus, the driver will be distressed when the vehicle slows or brakes at different rates as it is allowed to coast to a stop. Not only is such operational performance stressful to drivers who may not understand if some component of the vehicle has malfunctioned or been damaged, but also negatively impacts driver satisfaction and necessitates extraneous concentration when slowing due to the perceived unpredictability of the vehicle during engine braking. A regenerative braking system or improvements thereto that does not suffer from the above disadvantages would thus be desired. A regenerative braking system or improvements thereto that accommodates the possibility of reaching full battery charge during charging without influencing the driving performance of the vehicle would be advantageous. In addition, a regenerative braking system or improvements thereto that allows for efficient use of generated energy by additional vehicle components to prevent energy waste would also be advantageous.

SUMMARY

A system or method for diverting energy as part of a regenerative braking system is described. In one embodiment, the present invention may provide a regenerative braking system for a vehicle including a generator coupled with the vehicle for generating energy. A battery is switchably coupled with the generator for receiving at least a portion of the energy from the generator. A first device is switchably coupled with the generator for receiving at least a portion of the energy from the generator and a second device is switchably coupled with the generator for receiving at least a portion of the energy from the generator. A processor is configured to control the switchable coupling of the battery, the first device and the second device with the generator based on a state of charge of the battery or an instantaneous temperature of air in an interior of the vehicle.

In another embodiment, the present invention may provide a system for diverting regenerative energy from a generator of an electric vehicle including a battery coupled with the generator through a first switch having a closed configuration and an open configuration, the battery configured to receive regenerative energy from the generator when the first switch is in the closed configuration. A heater is coupled with the generator through a second switch having a closed configuration and an open configuration, and the heater is configured to receive regenerative energy from the generator when the second switch is in the dosed configuration. An air conditioning unit is coupled with the generator through a third switch having a closed configuration and an open configuration, and the air conditioning unit is configured to receive regenerative energy from the generator when the third switch is in the closed configuration. A processor is coupled with the battery, the first switch, the second switch and the third switch. The processor is configured to control the first switch to the open configuration and the second switch or the third switch to the closed configuration if or when the battery has a state of charge above a predetermined threshold.

In still another embodiment, the present invention may provide a method of diverting energy in a regenerative braking system for an electric vehicle. The method comprises the steps of providing a battery, a heater and an air conditioning unit coupled with the electric vehicle, determining if or when the battery has a state of charge above a predetermined threshold, determining if or when a temperature for air in an interior of the electric vehicle is desired and alternatingly transmitting at least a portion of the energy to the heater and to the air conditioning unit for maintaining a substantially constant temperature for air in the interior of the electric vehicle if or when the state of charge of the battery is above the predetermined threshold.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1A:
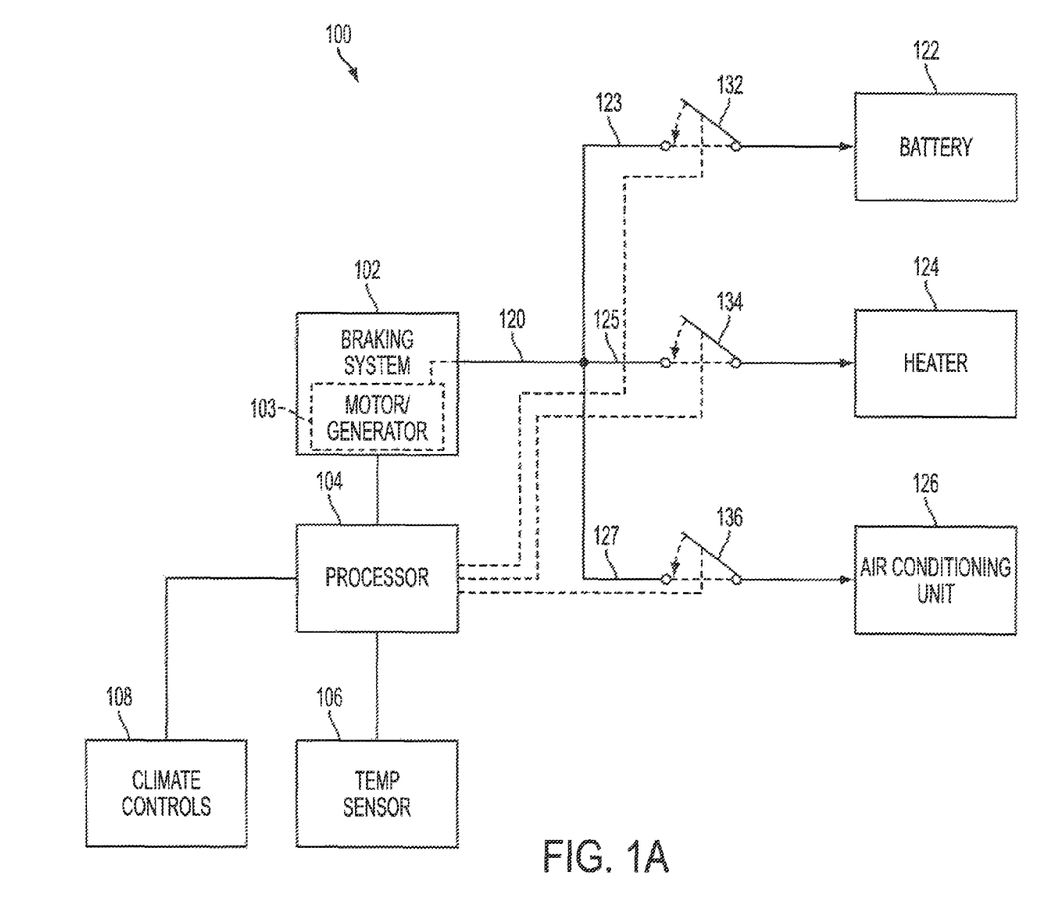
FIG. 1A is a block diagram of a regenerative braking system of a vehicle utilizing diversion of energy via switches according to an embodiment of the present invention.

Referring to FIG. 1A, a block diagram is shown of a regenerative braking system 100 for a vehicle. The regenerative braking system 100 utilizes diversion of energy functionality in order to transmit or propagate energy to various components or devices of the regenerative braking system 100 of the vehicle, as discussed in greater detail herein. By diverting this regenerative energy to the vehicle components or devices, improved driveability results due to a maintained or substantially constant deceleration rate. The regenerative braking system 100 also allows such energy to be utilized by alternative components or devices if or when a specific component or device cannot currently use the provided energy. In addition, energy usage may also be more effectively utilized when directly transmitted to one or more components instead of first charging a battery and then discharging the battery for powering the one or more components.

The regenerative braking system 100 includes a braking system 102 connected with a processor 104. The braking system 102 may include a variety of vehicle components, such as a motor/generator, rotors, brake pedals, brake fluid lines, energy capture components, electronic controllers, etc., such that regenerative energy is output from the braking system 102 during slowing of the vehicle, for example, when a driver of the vehicle removes his or her foot from the accelerator pedal, allowing the vehicle to coast and reduce speed. The regenerative energy may be produced or generated by a generator 103 of the braking system 102 and configured to be output from the generator 103 to various devices, as discussed in greater detail herein. Thus, the energy generated during slowing or braking can be used to recoup some of the energy lost during stoppage of the vehicle. The generator 103 may be an electric motor capable of operating as an electric generator during braking or any other type of device or component configured to create or produce regenerative energy for the vehicle during slowing or braking of the vehicle. A temperature sensor 106 and user-manipulable climate controls 108 are connected with the processor 104. The processor 104 responds to the temperature sensor 106 and/or the climate controls 108 in order to switchably connect one or more of the various devices to the braking system 102 for receiving the regenerative energy from the braking system 102.

In one embodiment, the processor 104 communicates with and controls the braking system 102, the temperature sensor 106, the user-manipulable climate controls 108 and the switches (132, 134 and 136) using transmission of electronic signals through a Control Area Network (CAN) bus. In other embodiments, the control and communication may be over various other types of serial communication links, direct wirings, digital communication buses, wireless communications or other communication links. Other systems or methods known in the art for communication and control between the processor 104, the braking system 102, the temperature sensor 106, the user-manipulable climate controls 108 and the switches (132, 134 and 136) may be utilized without limiting the scope of the present invention.

The battery 122 is configured to receive energy from the generator 103 of the braking system 102 and utilize the energy to store a charge for powering one or more components or systems of the vehicle. The battery 122 may be a rechargeable battery, for example, a lead-acid battery, a nickel metal hydride (NiMH) battery or a lithium-ion (Li-ion) battery. A second device, for example a heater 124, is also configured to receive energy from the generator 103 of the braking system 102 for providing heated air to an interior cabin of the vehicle. The heater 124 may be a resistance heater configured to conduct electricity along a wire or coil for heating the wire or coil and thereby warming the surrounding air. A third device, for example an air conditioning unit 126, is configured as well to receive energy from the generator 103 of the braking system 102 for providing cooled or chilled air to the interior cabin of the vehicle. The air conditioning unit 126 may be an HVAC compressor or any other type of device or plurality of devices for reducing the temperature of air or fluid therein. Each of the battery 122, the heater 124 and the air conditioning unit 126 is coupled with the braking system 102 via switching components, as discussed in greater detail herein.

The generator 103 of the braking system 102 is connected with or includes an output line 120 (e.g., a wire or a conductor) for outputting the produced regenerative energy. The output line 120 splits or otherwise connects to a plurality of energy lines (e.g., conductors) (123, 125 and 127), each energy line (123, 125 and 127) connecting to a separate device that is configured to receive energy from the braking system 102 through a switched connection. In an alternative embodiment, more than one device may be connected to a single energy line. As shown, the braking system 102 outputs energy on the output line 120, some or all of the energy traveling along the energy line 123 and to a switch 132 connected to the battery 122. If the switch 132 is in a closed configuration, the battery 122 is permitted to receive the energy from the braking system 102 along the output line 123. However, if the switch 132 is in an open configuration, then the battery 122 is not permitted to receive the energy from the braking system 102.

Similarly, the braking system 102 outputs energy on the output line 120, some or all of the energy traveling along the energy line 125 and through a switch 134 to the heater 124. If the switch 134 is in a closed configuration, the heater 124 is permitted to receive the energy from the braking system 102. However, if the switch 134 is in an open configuration, then the heater 124 is not permitted to receive the energy from the braking system 102. Likewise, the braking system 102 outputs energy on the output line 120, some or all of the energy traveling along the energy line 127 and through a switch 136 to the air conditioning unit 126. If the switch 136 is in a closed configuration, the air conditioning unit 126 is permitted to receive the energy from the braking system 102. However, if the switch 136 is in an open configuration, then the air conditioning unit 126 is not permitted to receive the energy from the braking system 102.

In this manner, the energy from the braking system 102 may be selectively controlled or propagated to one or more desired devices. In an alternative embodiment, the braking system 102 may itself contain one or more switching components or elements for appropriately diverting the energy output to various devices. In an alternative embodiment, any of a variety of switch configurations may be utilized, for example, a bank of switches whereby the number of switches in the closed configuration may be controlled to limit the amount of electrical energy permitted to pass to the battery 122, for example through the use of resistors. In such an embodiment, the energy from the braking system 102 may be controlled along the output line 123 in addition to being fully on or fully off.

The processor 104 interfaces with the switches (132, 134 and 136) in order to control them to their open or closed configurations. The processor 104 determines the desired configuration of the switches (132, 134 and 136) based upon inputs from a variety of vehicle systems or components. In one embodiment as shown in FIG. 1A, the processor 104 is connected to the temperature sensor 106 for determining a temperature of air in the interior cabin of the vehicle, the climate controls 108 for determining a desired temperature in the interior cabin of the vehicle and the battery 122 for determining a state of charge of the battery 122 (e.g., if the state of charge is fully charged or above a predetermined threshold). A memory (not shown) may be connected to the processor 104 for storing data corresponding to the thresholds. The memory may be embedded in the processor 104 or may be a separate unit. The thresholds may be stored as an algorithm, a look-up table or other forms of data in the memory or the processor 104.

The processor 104 may receive data corresponding to a state of charge of the battery 122 from a battery management system or a separate processor (not shown) over a Control Area Network (CAN) bus or other communication links. The processor 104, a battery management system or a separate processor may monitor the charging operation of the battery 122 using sensors that monitor the current in or out of the battery 122, the voltage, the temperature, the leak current, the state of health, the state of charge and/or other state and parameters of the battery 122. In one embodiment, the battery 122 may include multiple battery cells, and the battery management system is capable of monitoring and controlling the cells of the battery 122. The battery management system or a separate processor can determine the state of health of the cells of the battery 122 by evaluating the charge acceptance, internal resistance, voltage and self-discharge of the cells of the battery 122. The battery management system can transmit control signals to relays for selectively activating a connection of the battery 122 to various loads positioned inside the vehicle. The loads can be, for example, various units or devices of the vehicle having programmable memory items.

In one embodiment, the battery management system or the separate processor communicates the monitored parameters including the state of charge of the battery 122 to the processor 104. In another embodiment, the state of charge of the battery 122 is reported as a percentage relative to the current charging capacity of the battery 122.

In one example, if the state of charge of the battery 122 is below the predetermined threshold, and if the user of the vehicle has manipulated the climate controls 108 to indicate a desired temperature for the cabin of the vehicle, but the temperature sensor 106 senses a temperature in the cabin less than the desired temperature, the processor 104 of the vehicle may control the switch 132 to the closed configuration, the switch 134 to the closed configuration and the switch 136 to the open configuration. Rather than providing all energy to the battery 122 and running the heater 124 off of the battery 122, as may be performed in a conventional automotive system, the regenerative braking system 100 allows the heater 124 and the battery 122 to simultaneously operate from energy output from the braking system 102, thus reducing efficiency loss. In addition, if the battery 122 were fully charged, the processor 104 may control only the switch 134 to the closed configuration while the other switches (132 and 136) are controlled to the open configuration. Thus, energy can be captured from the braking system 102 and used even beyond the max charging capability of the battery 122.

In another example, if the state of charge of the battery 122 is less than the predetermined threshold and if the user of the vehicle has manipulated the climate controls 108 to indicate a desired temperature for the cabin of the vehicle, but the temperature sensor 106 senses a temperature in the cabin greater than the desired temperature, the processor 104 of the vehicle may control the switch 132 to the closed configuration, the switch 134 to the open configuration and the switch 136 to the closed configuration. Rather than providing all energy to the battery 122 and running the air conditioning unit 126 off of the battery 122, as may be performed in a conventional automotive system, the regenerative braking system 100 allows the air conditioning unit 126 and the battery 122 to simultaneously operate from energy output from the braking system 102, again reducing efficiency loss. In addition, if the state of charge of the battery 122 is above the predetermined threshold, the processor 104 may control only the switch 136 to the closed configuration while the other switches (132 and 134) are controlled to the open configuration. Thus, energy can be captured from the braking system 102 and used even beyond the max charging capability of the battery 122.

In yet another example, if the state of charge of the battery 122 is below the predetermined threshold or not fully charged, and if the user has manipulated the climate controls 108 such that no heating or cooling of the cabin of the vehicle is desired or if the temperature sensor 106 senses that the cabin temperature equals a desired temperature set by the user via the climate controls 108, the processor 104 may control only the switch 132 to the closed configuration while the other switches (134 and 136) are controlled to the open configuration. However, if the state of charge of the battery 122 is above the predetermined threshold, the processor 104 may instead control the switch 132 to the open configuration and appropriately control both the switch 134 and the switch 136 such that the cabin temperature of the vehicle does not substantially rise or decrease due to the heater 124 or the air conditioning unit 126. This may be accomplished by operating the heater 124 and the air conditioning unit 126 simultaneously, such that the heating of air by the heater 124 and the cooling of air by the air conditioning unit 126 cancel each other out. Alternatively, this may be accomplished by operating only the heater 124 for a first predetermined period of time and then alternating to operate only the air conditioning unit 126 for a second predetermined period of time, thus substantially maintaining the same cabin temperature. The first predetermined period of time and the second predetermined period of time may be the same or difference from one another. In this manner, the deceleration rate or speed of the vehicle is maintained substantially constant even if the battery 122 is at a full state of charge and thus not accepting of any more energy for charging purposes.

In an alternative embodiment, additional, fewer or different devices may be connected to the braking system 102 via a switched connection or non-switched connection. The processor 104 may also be connected with additional, fewer or different systems, devices or components for controlling the switched connection to the varying devices. The processor 104 may be the Engine Control Unit (ECU) of the vehicle or may be a separate processor included on or in the vehicle. Energy may be diverted from the braking system 102 to the varying devices according to any of a variety of logical parameters. For example, energy may be prevented from propagating to the battery 122 of the vehicle even if the vehicle is not yet fully charged, but instead has passed a predetermined threshold, such as, 80% of total charge capacity. In another embodiment, the predetermined threshold is a power/energy amount or value (e.g., kW or kWh) which is less than or equal to a power/energy amount or value corresponding to a full state of charge of the battery 122.

Figure 1B:
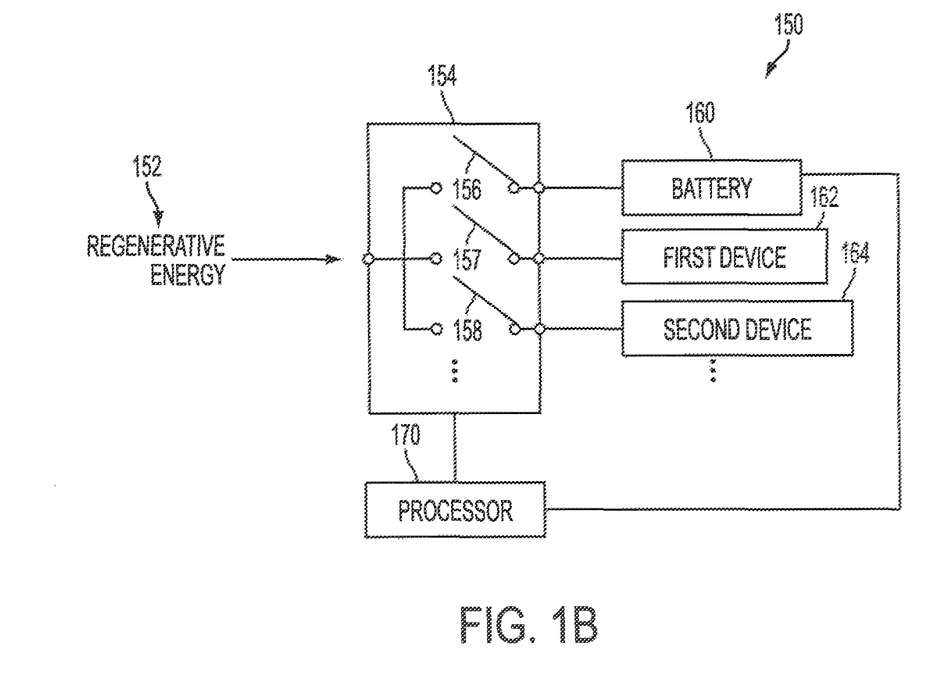
FIG. 1B is a block diagram of a regenerative braking system of a vehicle utilizing diversion of energy via a switch bank according to an embodiment of the present invention.

FIG. 1B shows a block diagram of a regenerative braking system 150 of a vehicle utilizing diversion of energy via a switch bank. The regenerative braking system 150 may include certain structural or functional features that are the same or similar to the regenerative braking system 100 previously described for FIG. 1A. The regenerative braking system 150, however, is shown with a switch bank 154 containing or housing various switches (156, 157, 158 and etc.) for connecting or transmitting regenerative energy 152 of the regenerative braking system 150 to various devices, as discussed in greater detail herein.

Three devices are shown, including a battery 160, a first device 162 and a second device 164. In an alternative embodiment, any number of devices can be connected to the switch bank 154 for connection/disconnection with the regenerative energy 152. A processor 170 is connected with the switch bank 154 for controlling the configuration of the various switches (156, 157, 158 and etc.) therein and also to the battery 160, for example, to detect when the battery 160 has a state of charge above a predetermined threshold. In certain embodiments, the processor 170 may also or alternatively be connected to any of the first device 162, the second device 164 or other devices or components of the vehicle.

The same or similar to the discussion above for FIG. 1A, the various switches (156, 157, 158 and etc.) of the switch bank 154 are controlled by the processor 170 in order to connect or disconnect the battery 160, the first device 162 and/or the second device 164 to the regenerative energy 152 produced or generated during slowing or braking of the vehicle. In an alternative embodiment, the various switches (156, 157, 158 and etc.) may be positioned or located at any of a variety of locations or housings of the vehicle such that they are capable of coupling or decoupling the regenerative energy 152 to the desired devices of the vehicle. For example, the switch 156 may be incorporated into a housing of the battery 160, the switch 157, may be incorporated into a housing of the first device 162 and/or the switch 158 may be incorporated into a housing of the second device 164. In still another embodiment, one or more of the various switches (156, 157, 158, etc.) may be incorporated into a housing of a generator or other component that is configured to generate the regenerative energy 152. Any number of switches may be used for connecting any number of desired batteries and/or devices to the regenerative energy 152.

Figure 2:
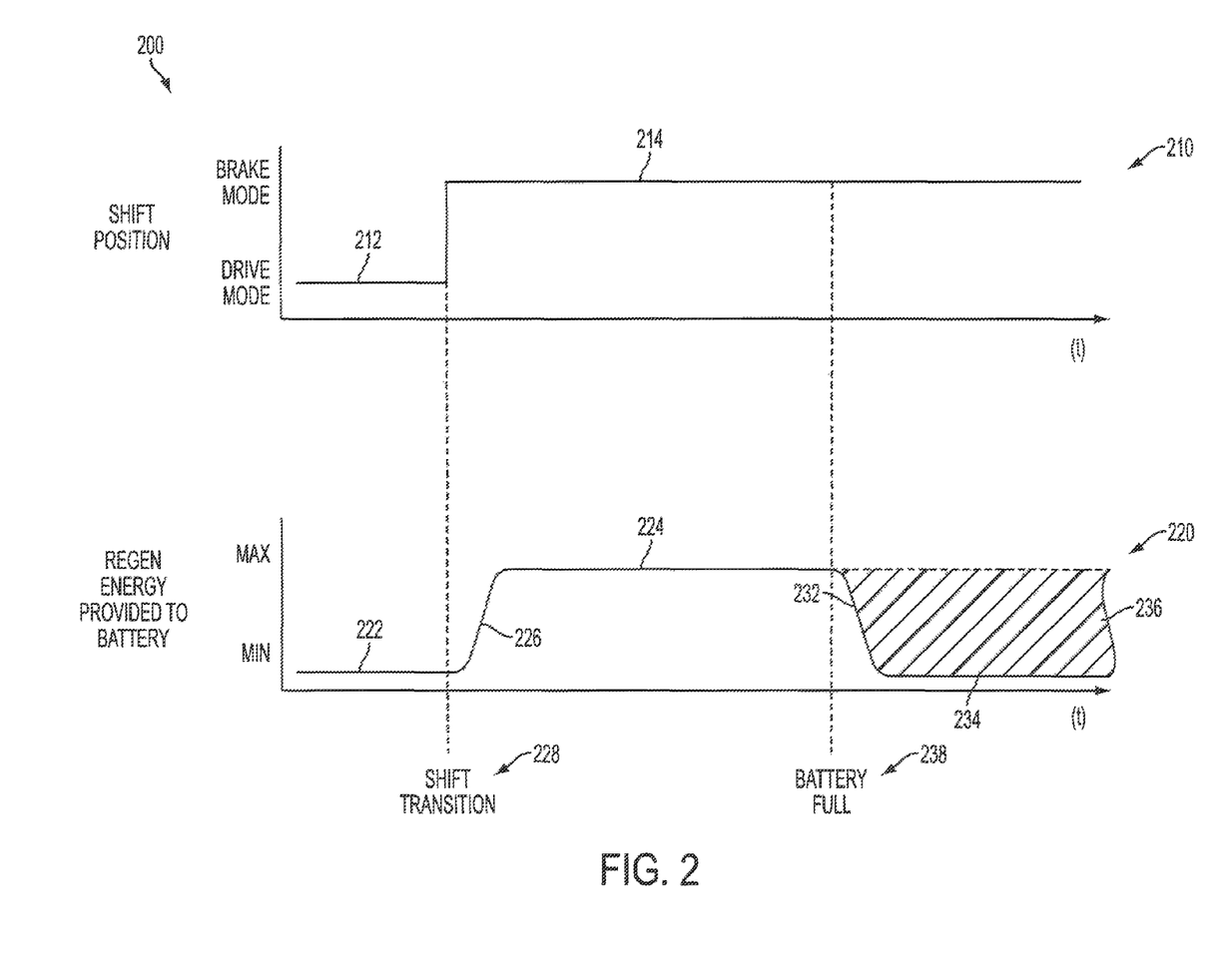
FIG. 2 is a graph showing provision of energy in a regenerative braking system of a vehicle according to an embodiment of the present invention.

FIG. 2 shows a plurality of graphs 200 for demonstrating provision of energy in a regenerative braking system for a vehicle. The regenerative braking system of the graphs 200 may be the same or similar to the regenerative braking systems previously described. A first graph 210 shows the switching between a brake mode and a drive mode for the vehicle with respect to time. Initially, the shift position of the vehicle is indicative of a DRIVE MODE 212 (e.g., a user of the vehicle may be pressing on the accelerator pedal to cause the vehicle to move or accelerate in a particular direction). At a shift transition time 228, however, the shift position of the vehicle changes to be indicative of a BRAKE MODE 214 (e.g., the user of the vehicle may have lifted their foot from the accelerator pedal causing the vehicle to begin decelerating or coasting).

A second graph 220 shows regenerative energy from a braking system of the vehicle that is provided to the battery 122 or 160 for recharging the battery 122 or 160 with respect to time. An initial portion 222 of the second graph 220 indicates that no regenerative energy is provided to the battery 122 or 160, corresponding to the DRIVE MODE 212 shift position. A subsequent increasing transition portion 226 of the second graph 220 indicates that an increasing amount of regenerative energy is provided to the battery 122 or 160, near the shift transition time 228. The increasing transition portion 226 may have a greater or lesser slope in an alternative embodiment.

A charging portion 224 of the second graph 220 occurs while the battery 122 or 160 uses the regenerative energy to charge to reach a state of charge above a predetermined threshold. During the charging portion 224, regenerative energy flowing from the braking system to the battery 122 or 160 is at its maximum. However, after the state of charge of the battery 122 or 160 is equal to or above the predetermined threshold (denoted by battery full 238 in FIG, 2), the regenerative energy flowing from the braking system to the battery 122 or 160 decreases. In an embodiment, the predetermined threshold corresponds to a maximum state of charge of the battery 122 or 160. In another embodiment, the predetermined threshold corresponds to a state of charge of the battery 122 or 160 which is less than or equal to the maximum state of charge of the battery 122 or 160 in order to achieve optimal battery performance. The predetermined threshold may be a predetermined percentage (e.g., 80%) of a full state of charge of the battery 122 or 160. A decreasing transition portion 232 of the second graph 220 indicates a decreasing amount of regenerative energy being provided to the battery 122 or 160 until a final portion 234 of the second graph 220 again indicates no regenerative energy being provided to the battery 122 or 160. The decreasing transition portion 232 may have a greater or less slope in an alternative embodiment.

At the battery full time 238, the shift position of the vehicle may still be in BRAKE MODE 214 as shown, even after the battery 122 or 160 reaches its maximum charging capacity. Thus, the braking system may still be producing regenerative energy for utilization, but the battery 122 or 160 is no longer accepting of such energy. In a conventional automotive system, this produced energy is wasted or dissipated as heat and not utilized by vehicle systems or components. By instead diverting this conventionally wasted energy to devices or systems other than the battery 122 or 160, the energy may continue to be absorbed (as shown by the shaded region 236)

and utilized so as to maintain a constant deceleration rate for the vehicle, as previously discussed.

For example, when a user of the vehicle does not desire a change in temperature in the vehicle cabin due to heating/cooling systems of the vehicle, the regenerative energy may be provided on an alternating basis or simultaneously provided to both the heating system and the cooling system such that the temperature in the cabin does not substantially change. By utilizing this energy for maintaining the temperature instead of dissipating it without utilization, the vehicle deceleration remains consistent regardless of whether the battery 122 or 160 is charging or not. When a user of the vehicle does desire a change in temperature in the vehicle cabin, the appropriate heating system or cooling system may be connected with the regenerative energy of the braking system. Thus, the energy may still be utilized by the vehicle for powering systems or components of the vehicle even if the battery 122 or 160 has already reached its state of maximum or optimal charge.

Figure 3:
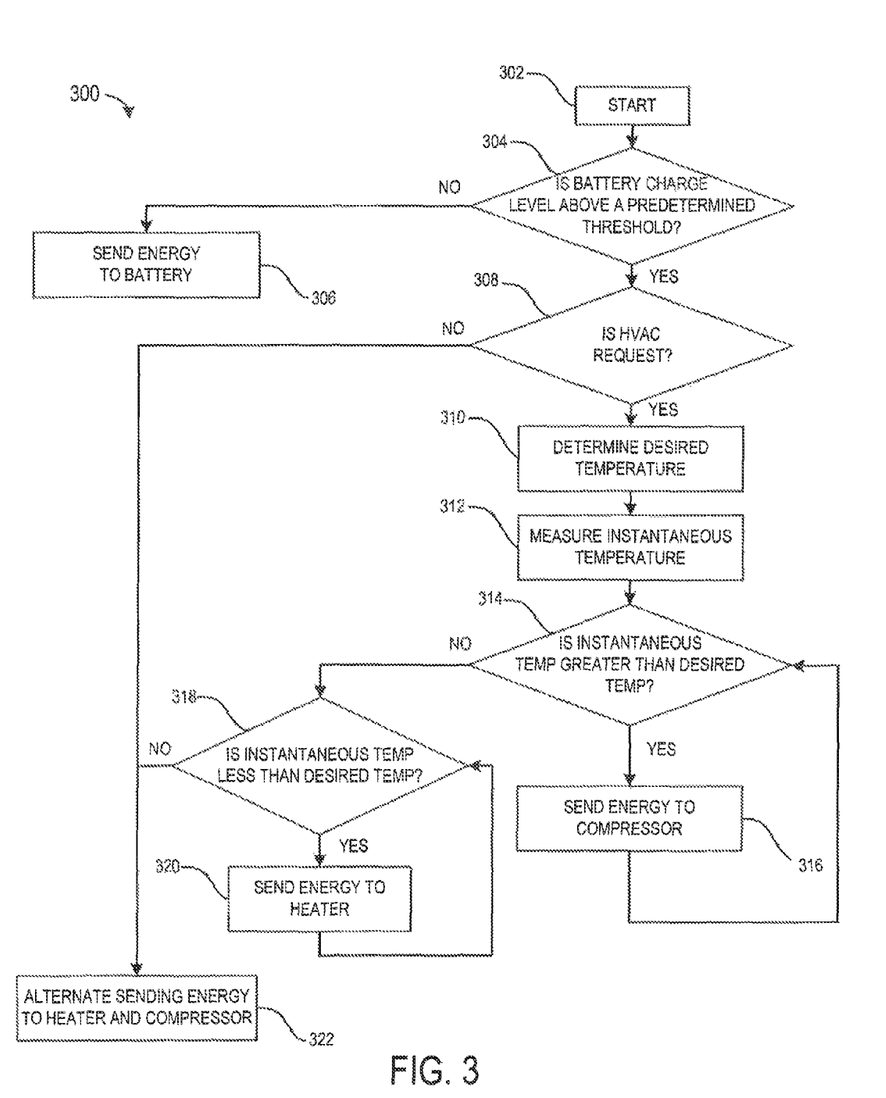
FIG. 3 is a flowchart of a regenerative braking system of a vehicle according to an embodiment of the present invention.

FIG. 3 shows a flowchart 300 describing a regenerative braking system of a vehicle. The regenerative braking system may be the same as or similar to the regenerative braking systems previously described. One or more of the process steps of the flowchart 300 may be performed by a processor of the regenerative braking system. At step 302, the process starts, for example, when a driver of the vehicle lifts his or her foot from the accelerator pedal of the vehicle, thus causing the vehicle to begin slowing in speed. At step 304, the processor receives a signal or otherwise determines a state of charge for the battery 122 of the vehicle and determines whether the state of charge of the battery 122 is above a predetermined threshold. In one embodiment, the predetermined threshold may correspond to a full state of charge. In another embodiment, the predetermined threshold may be a percentage (e.g., 80%) of a full state of charge of the battery 122 or the vehicle. Alternatively, the predetermined threshold may correspond to a power amount or value less than or equal to a power amount or value corresponding to a full state of charge of the battery 122 or the vehicle. If the state of charge of the battery 122 is not above the predetermined threshold, operation continues to step 306. If the state of charge of the battery 122 is above the predetermined threshold, operation continues to step 308.

At step 306, energy of the regenerative braking system (e.g., the regenerative energy generated when the driver of the vehicle lifts his or her foot from the accelerator pedal of the vehicle and causes the vehicle to begin slowing in speed) is sent or otherwise transmitted to the battery 122 of the vehicle. This occurs because the state of charge of the battery 122 is not above the predetermined threshold (e.g., at a full state of charge) and the battery 122 may still accept energy fur storage purposes. At step 308, however, energy of the regenerative braking system may be sent or transmitted to alternative devices or components, as discussed in greater detail herein, due to the charge level threshold of the battery 122 having been met. The processor receives a signal or otherwise determines whether an HVAC request has been made or is desired. For example, the driver or other user of the vehicle may have manipulated user controls within the vehicle to turn on or request utilization of a heating or air conditioning system of the vehicle of the vehicle. If no HVAC request has been made, operation continues to step 322, as discussed in greater detail herein. If an HVAC request has been made, operation continues to step 310.

At step 310, the processor determines the desired temperature for air within the passenger or interior cabin of the vehicle. This may be performed by interfacing with various user controls of the vehicle or with other processors, controllers or systems of the vehicle. For example, a vehicle may contain an electronic system in the dash of the vehicle with a variety of controls such as buttons, knobs, voice-activation software, touch-screen interfaces, or the like, such that a user may set a desired temperature or heating/cooling request for the air in the interior of the vehicle by interfacing with or manipulating one or more of the controls. At step 312, the instantaneous temperature of the air in the passenger or interior cabin of the vehicle is measured. This may be performed by a temperature sensor in communication with the processor and configured to sense the temperature of the air.

At step 314, the processor compares the instantaneous temperature of the air in the passenger or interior cabin of the vehicle measured in step 312 with the desired temperature for the air in the passenger or interior cabin of the vehicle determined in step 310. If the instantaneous temperature is not greater than the desired temperature, operation continues to step 318, as discussed in greater detail herein. If the instantaneous temperature is greater than the desired temperature, operation continues to step 316. At step 316, at least a portion of the energy of the regenerative braking system is sent or otherwise transmitted to the air conditioning unit 126 having a compressor for cooling or chilling of air in or of the compressor. In certain embodiments, all of the energy of the regenerative braking system may be transmitted to the compressor. This chilled air may then be blown or otherwise passed into the passenger or interior cabin of the vehicle for reducing the overall temperature of air in the passenger or interior cabin.

At step 318, the processor determines if the instantaneous temperature is less than the desired temperature. If the instantaneous temperature is not less than the desired temperature, operation continues to step 322. If the instantaneous temperature is less than the desired temperature, operation continues to step 320. At step 320, at least a portion of the energy of the regenerative braking system is sent or otherwise transmitted to a heater of the vehicle for heating of air in or nearby its heating elements. The heater may he a resistance heater employing a coil or wire configured to warm in temperature when supplied with an electric current. In certain embodiments, all of the energy of the regenerative braking system may be transmitted to the heater. This heated air may then be blown otherwise passed into the passenger or interior cabin of the vehicle for increasing the overall temperature of air in the passenger or interior cabin.

At step 322, energy of the regenerative braking system is alternatively sent or transmitted to the heater and the compressor. For example, energy may first be sent to the heater fir a first predetermined period of time. Subsequently, energy may next be sent to the compressor for a second predetermined period of time after the first period of time. Thus, air in the passenger or interior cabin of the vehicle may be maintained at a substantially constant temperature via the alternatively cooled and heated air that is passed into the cabin from the compressor and heater, respectively. In an alternative embodiment, energy of the regenerative braking system may be sent simultaneously to the heater and to the compressor, in this manner, even when the battery 122 is at a state of charge above a predetermined threshold (e.g., a full state of charge) and no longer capable of accepting and/or storing energy of the regenerative braking system, the vehicle will be able to maintain a substantially constant deceleration rate since the energy of the regenerative braking system is utilized by devices or components of the vehicle even in the absence of any HVAC request or when a desired temperature is already obtained in the passenger or interior cabin. The rate at which the energy is alternated between the heater and the compressor may be any of a variety of rates for efficient utilization of energy and/or maintenance of temperature.

An alternative embodiment of a regenerative braking system utilizing diversion of energy may utilize alternative process steps in addition to or in replacement of the process steps specifically outlined in the flowchart 300. An alternative embodiment may utilize greater or fewer process steps or with alternative ordering than as shown in the flowchart 300. Moreover, an alternative embodiment may have varying operational functionality and/or utilize additional, alternative or fewer devices for the transmittal or energy. For example, one embodiment of a regenerative braking system may transmit energy to the heater and/or compressor of the vehicle even when the battery 122 does not have a state of charge that exceeds a predetermined threshold (e.g., energy is transmitted to both the battery 122 and the compressor and/or heater). In another example, a regenerative braking system may transmit energy of the regenerative braking system to a Global Positioning System ("GPS") or other navigation system if the battery 122 has a state of charge above a predetermined threshold in place of or in addition to a heater and/or compressor.

Those of ordinary skill will appreciate that the various illustrative logical blocks, modules, and algorithm steps described in connection with the examples disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The logical steps for any energy diversion system for a braking system to devices utilizing such energy described in connection with the examples disclosed above may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific integrated Circuit (ASIC). The ASIC may reside in a wireless modem. In the alternative, the processor and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A regenerative braking system for a vehicle comprising:
   a generator coupled with the vehicle for generating energy during a deceleration of the vehicle;
   a battery having a state of charge and switchably coupled with the generator for receiving at least a portion of the energy from the generator;
   a first device switchably coupled with the generator for receiving at least a portion of the energy from the generator;
   a second device switchably coupled with the generator for receiving at least a portion of the energy from the generator; and
   a processor configured to control the switchable coupling of the battery, the first device and the second device with the generator based on the state of charge of the battery or an instantaneous temperature of air in an interior of the vehicle and, when the state of charge of the battery is greater than a predetermined threshold and the instantaneous temperature of air in the interior of the vehicle is equal to a desired temperature of air in the interior of the vehicle, to couple the first device to the generator for a first predetermined amount of time and then couple the second device to the generator for a second predetermined amount of time or to couple the first device and the second device to the generator such that an effect of the first device cancels out an effect of the second device.

2. The regenerative braking system of claim 1 wherein the processor is configured to couple the battery to the generator only when the state of charge of the battery is less than a predetermined threshold.

3. The regenerative braking system of claim 2 wherein the processor is configured to couple the first device to the generator or the second device to the generator when the state of charge of the battery is greater than the predetermined threshold for maintaining a constant deceleration rate for the vehicle.

4. The regenerative braking system of claim 2 wherein the processor is configured to couple the first device to the generator and the second device to the generator when the state of charge of the battery is greater than the predetermined threshold for maintaining a constant deceleration rate for the vehicle.

5. The regenerative braking system of claim 1 wherein the first device is a heater for providing heated air to an interior of the vehicle and the second device is an air conditioning unit for providing cooled air to the interior of the vehicle.

6. The regenerative braking system of claim 5 further comprising a climate control element coupled with the processor for setting a desired temperature of air in the interior of the vehicle.

7. The regenerative braking system of claim 6 wherein the processor is configured to couple the heater to the generator when the desired temperature is greater than an instantaneous temperature of air in the interior of the vehicle.

8. The regenerative braking system of claim 7 wherein the processor is configured to couple the air conditioning unit to the generator when the desired temperature is less than the instantaneous temperature of air in the interior of the vehicle.

9. A system for diverting regenerative energy from a generator of an electric vehicle comprising:
   a battery having a state of charge, coupled with the generator through a first switch having a closed configuration and an open configuration and configured to receive regenerative energy from the generator when the first switch is in the closed configuration;
   a heater coupled with the generator through a second switch having a closed configuration and an open configuration and configured to receive regenerative energy from the generator when the second switch is in the closed configuration;

an air conditioning unit coupled with the generator through a third switch having a closed configuration and an open configuration and configured to receive regenerative energy from the generator when the third switch is in the closed configuration; and a processor coupled with the battery, the first switch, the second switch and the third switch and configured to control the first switch, the second switch and the third switch such that when the state of charge of the battery is greater than a predetermined threshold and an instantaneous temperature of the air in the interior of the vehicle is equal to a desired temperature the interior of the vehicle, the processor controls the first switch to be in the open configuration, the second switch to be in the closed configuration and the third switch to be in the open configuration for a first predetermined amount of time and controls the first switch to be in the open configuration, the second switch to be in the open configuration, and the third switch to be in the closed configuration for a second predetermined amount of time or the processor controls the first switch to he in the open configuration, the second s itch to be in the closed configuration and the third switch to be in the closed configuration such that an effect of the heater cancels out an effect of the air conditioning unit.

10. The system of claim 9 further comprising a temperature sensor coupled to the processor and configured to sense the instantaneous temperature of the air in the interior of the vehicle.

11. The system of claim 10 further comprising a user control coupled to the processor, the user control configured to set a desired temperature for air in the cabin of the vehicle.

12. The system of claim 11 wherein the processor is configured to control the first switch to the closed configuration, the second switch to the closed configuration and the third switch to the open configuration when the temperature of air sensed by the temperature sensor is less than the desired temperature and the state of charge of the battery is less than the predetermined threshold.

13. The system of claim 12 wherein the processor is configured to control the first switch to the closed configuration, the second switch to the open configuration and the third switch to the closed configuration when the temperature of air sensed by the temperature sensor is greater than the desired temperature and the state of charge of the battery is less than the predetermined threshold.

14. A method of diverting energy in a regenerative braking system for an electric vehicle, the method comprising the steps of:

providing a battery, a generator, a heater and an air conditioning unit coupled with the electric vehicle;

determining if the battery has a state of charge greater than a predetermined threshold;

determining a desired temperature within a cabin of the electric vehicle;

determining an instantaneous temperature within the cabin of the electric vehicle; and coupling the heater to the generator for a first predetermined amount of time and then coupling the air conditioning unit to the generator for a second predetermined amount of time or coupling the heater and the air conditioning unit to the generator such that an effect of the heater cancels out an effect of the air conditioning unit when the state of charge of the battery is greater than the predetermined threshold and when the instantaneous temperature is equal to the desired temperature.

15. The method of claim 14 wherein the step of coupling the heater to the generator for a first predetermined amount of time and then coupling the air conditioning unit to the generator for a second predetermined amount of time or coupling the heater and the air conditioning unit to the generator maintains a constant deceleration rate for the electric vehicle.

16. The method of claim 14 further comprising the step of transmitting all of the energy to the battery of the electric vehicle when the state of charge of the battery is less than the predetermined threshold.

17. The method of claim 14 further comprising the steps of:

transmitting at least a portion of the energy to the heater when the instantaneous temperature is less than the desired temperature; and transmitting at least a portion of the energy to the air conditioning unit when the instantaneous temperature is greater than the desired temperature.

* * * * *